US008656633B2

(12) United States Patent
Renosky (10) Patent No.: US 8,656,633 B2
(45) Date of Patent: Feb. 25, 2014

(54) FISHING LURE WITH MOVABLE ATTACHMENT LOOP

(76) Inventor: Joseph Renosky, Indiana, PA (US)

( * ) Notice: Subject to any disclaimer, the term of this patent is extended or adjusted under 35 U.S.C. 154(b) by 0 days.

(21) Appl. No.: 13/065,280

(22) Filed: Mar. 19, 2011

(65) Prior Publication Data

US 2011/0239522 A1   Oct. 6, 2011

Related U.S. Application Data

(60) Provisional application No. 61/341,410, filed on Mar. 30, 2010.

(51) Int. Cl.
*A01K 85/10* (2006.01)
(52) U.S. Cl.
USPC .......................... 43/42.22; 43/42.39; 43/42.49
(58) Field of Classification Search
USPC ............ 43/42.03, 42.22, 42.28, 42.29, 42.49, 43/42.39
See application file for complete search history.

(56) References Cited

U.S. PATENT DOCUMENTS

| | | | | |
|---|---|---|---|---|
| 1,297,617 A * | 3/1919 | Welles | ............... | 43/42.15 |
| 1,418,229 A * | 5/1922 | Buddle | ............... | 43/42.18 |
| 1,836,650 A * | 12/1931 | Davenport | ............... | 43/42.29 |
| 2,507,908 A * | 5/1950 | Kaste | ............... | 43/42.03 |
| 2,608,016 A * | 8/1952 | Shipley | ............... | 43/42.22 |
| 2,989,817 A * | 6/1961 | Kepler | ............... | 43/42.39 |
| 3,192,660 A * | 7/1965 | Guess | ............... | 43/42.16 |
| 3,367,057 A * | 2/1968 | Pond | ............... | 43/42.02 |
| 3,412,500 A * | 11/1968 | Lahitnen | ............... | 43/41 |
| 3,462,871 A * | 8/1969 | McVay | ............... | 43/42.47 |
| 3,890,736 A * | 6/1975 | Worden | ............... | 43/42.11 |
| 3,902,267 A * | 9/1975 | Monchil | ............... | 43/42.23 |
| 3,990,171 A * | 11/1976 | Davis | ............... | 43/42.17 |
| 4,006,552 A * | 2/1977 | Cunningham | ............... | 43/42.48 |
| 4,223,469 A * | 9/1980 | Luz | ............... | 43/42.03 |
| 4,367,607 A * | 1/1983 | Hedman | ............... | 43/42.1 |
| 4,453,333 A * | 6/1984 | Olson | ............... | 43/42.5 |
| 4,862,629 A * | 9/1989 | Ryan | ............... | 43/42.25 |
| 5,029,410 A * | 7/1991 | Anderson | ............... | 43/44.95 |
| 5,394,636 A * | 3/1995 | Rabideau | ............... | 43/42.13 |
| 5,526,602 A * | 6/1996 | Day, Sr. | ............... | 43/37 |
| 5,857,283 A * | 1/1999 | Perrick | ............... | 43/42.5 |
| 6,772,553 B2 * | 8/2004 | Phillips et al. | ............... | 43/42.39 |
| 7,621,068 B1 * | 11/2009 | Renosky | ............... | 43/42.15 |
| 7,627,978 B2 * | 12/2009 | Davis | ............... | 43/42.15 |
| 2001/0045048 A1 * | 11/2001 | Johnson | ............... | 43/42.39 |
| 2005/0210731 A1 * | 9/2005 | Davis | ............... | 43/42 |
| 2006/0191186 A1 * | 8/2006 | Perrick | ............... | 43/42.47 |
| 2009/0211145 A1 * | 8/2009 | Thorne | ............... | 43/42.39 |

* cited by examiner

*Primary Examiner* — David Parsley
(74) *Attorney, Agent, or Firm* — Gary K. Price (57) ABSTRACT

A fishing lure includes a body, a skirt, a blade and a hook. The body includes a pivotable attachment 's' loop that attaches the blade to the body, the loop is pinned to the body but pivots about the pin in a slot in the body. A fishing line is attached to the blade at a point spaced from the loop, the skirt includes flexible filaments and is attached to the body. The hook is molded into the body and the 's' loop includes an elastic band that biases the loop toward the back of the slot.

16 Claims, 8 Drawing Sheets

FISHING LURE WITH MOVABLE ATTACHMENT LOOP

CROSS REFERENCES TO RELATED APPLICATIONS

Applicant claims priority under 35 USC 119 to U.S. provisional patent application 61/341,410 filed Mar. 30, 2010 and titled 'Fishing lure with movable attachment loop'.

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates generally to fishing and to fishing lures.

2. Brief Description of Prior Art

There have been many changes and improvements in fishing lures over the years. Many lures relate to specific applications and to catching specific fish in specific conditions.

Generally, lures attempt to attract fish by movement, sound and action that imitate nature or in some way that excites the fish's interest. U.S. Pat. No. 6,598,336 and patent application 2006/0185220 are two prior art lures that include a multi-filament skirt surrounding a hook. These lures do not include a method of creating noise or a method of creating an erratic motion and flash of light.

As can be seen, there is a need for an improved lure to attract fish.

SUMMARY OF THE INVENTION

A fishing lure includes a body, a skirt, a blade and a hook. The body includes a pivotable attachment 'S' loop that attaches the blade to the body, the 'S' loop is pinned to the body but pivots about the pin in a slot in the body. A fishing line is attached to the blade at a point spaced from the loop, the skirt includes flexible filaments and is attached to the body. The hook is molded into the body and the loop includes an elastic band that biases the loop toward the back of the slot.

DETAILED DESCRIPTION OF THE PREFERRED EMBODIMENT

Figure 1:
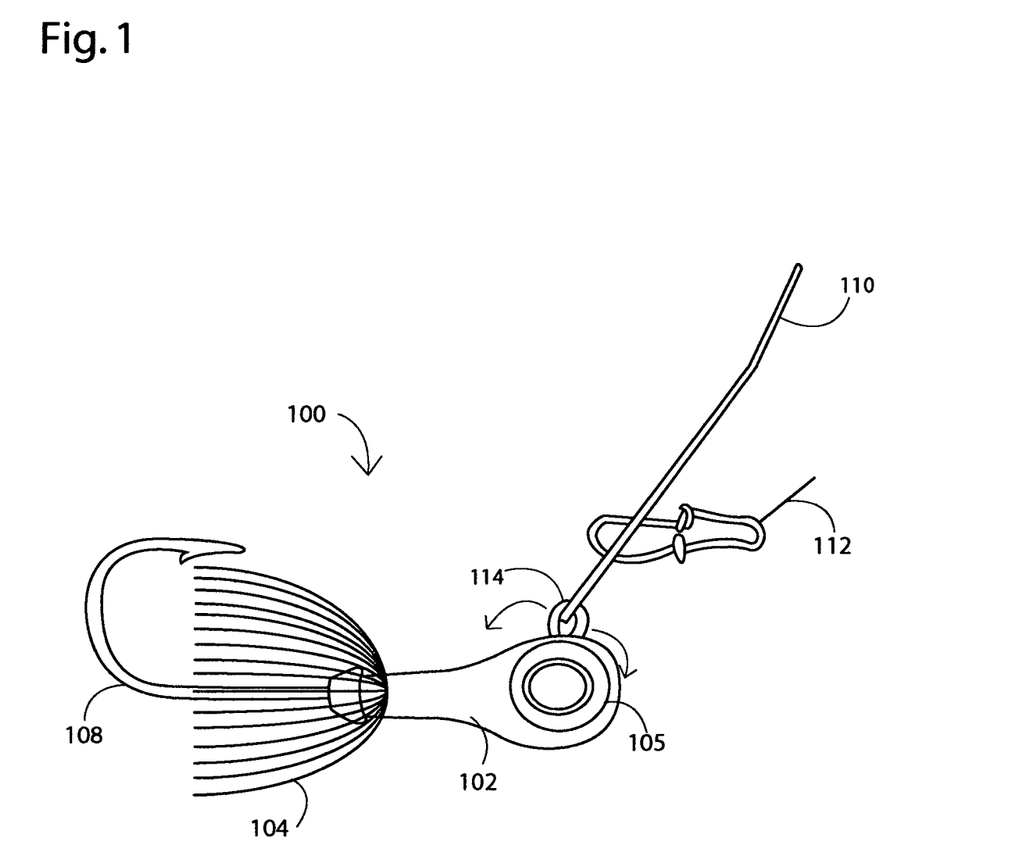
FIG. 1 shows the lure as it would appear in use.

FIG. 1 shows a fishing lure 100. The lure 100 includes a molded lure body 102, a lure skirt 104, a hook 108, a pivotable blade 110 attached to a fishing line 112 and to a movable 'S' loop 114. The lure 100 also includes a decorative eye 105 covering a pin 142 that pivotably attaches 'S' loop 114.

Figure 2:
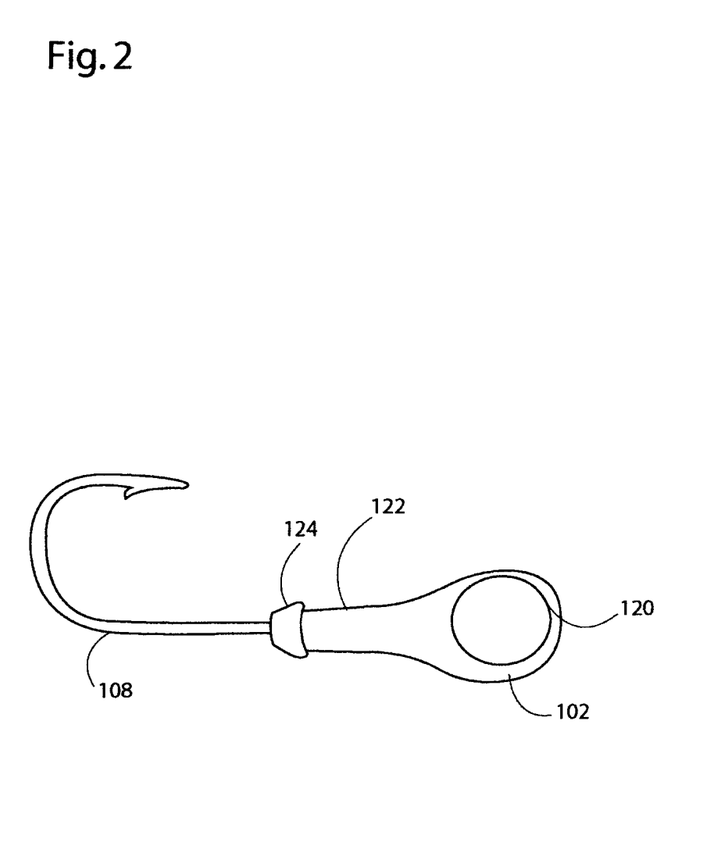
FIG. 2 shows details of the lure of FIG. 1.

FIG. 2 is a pre-assembly view that shows the body 102 and hook 108 which is a molded assembly. The body 102 which can be molded from a heavy material such as lead includes circular depressions 120 for the lure decorative eye 105 and a tail projection 122 at the back of the lure body 102. The tail projection 122 holds the skirt 104 and a raised area 124 at the end of the tail projection 122 retains the lure skirt 104 once it is fitted to the body 102.

Figure 3:
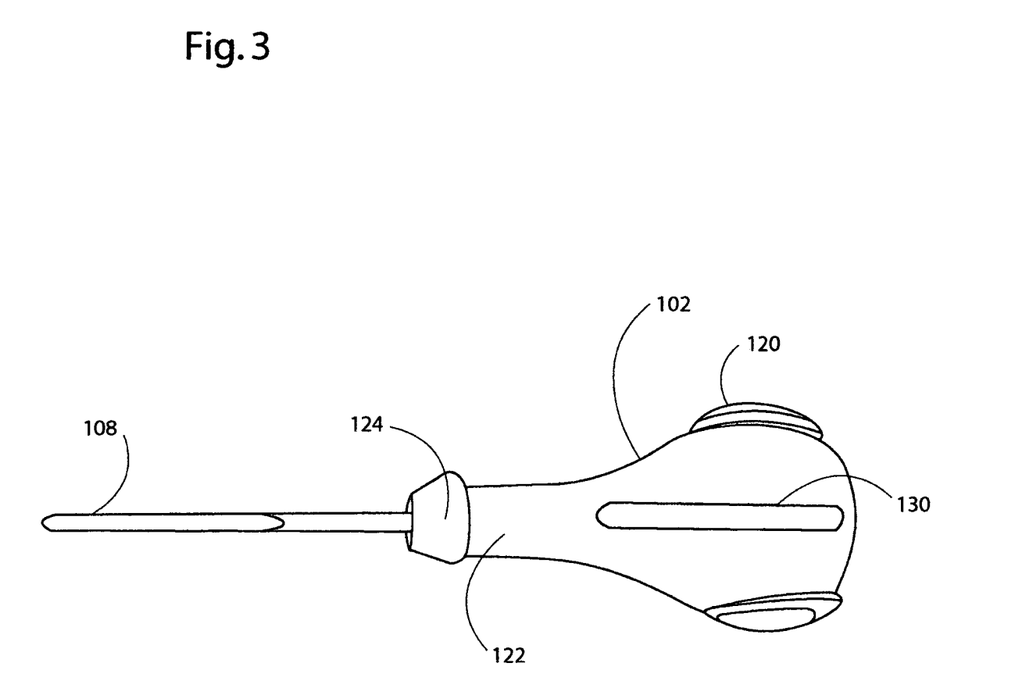
FIG. 3 shows a top view of detail of the lure of FIG. 1.

FIG. 3 shows a top view of the lure body 102 prior to assembly of the lure. The depressions 120 are shown on opposite sides of a slot 130. The slot 130 runs along the length of the body 102 and the depressions 120 are near the front end of the slot 130 which runs parallel to the overall length of the body 102 and hook 108.

Figure 4:
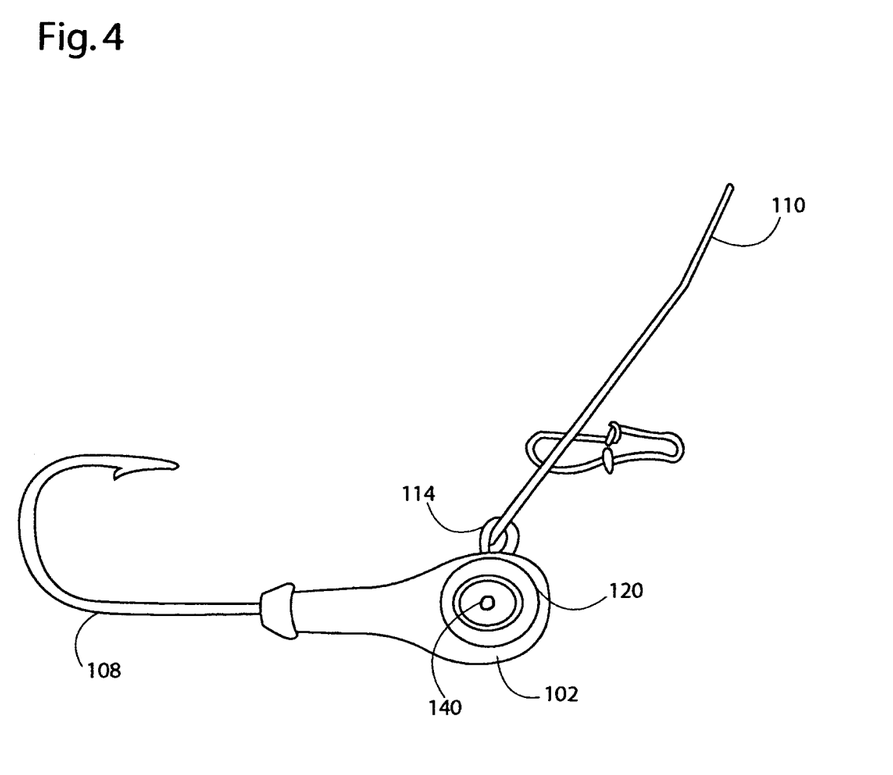
FIG. 4 shows additional details of the lure of FIG. 1

FIG. 4 shows the lure body 102 partially assembled with the pivotable 'S' loop 114 attached. The 'S' loop 114 is attached by drilling a hole 140 in the eye depressions 120 and fitting a pin 142 through the hole 140 so that the lower loop of 'S' loop 114 is pivotably mounted on the pin 142. This is probably best seen in the cross sectional view of FIG. 8.

Figure 5:
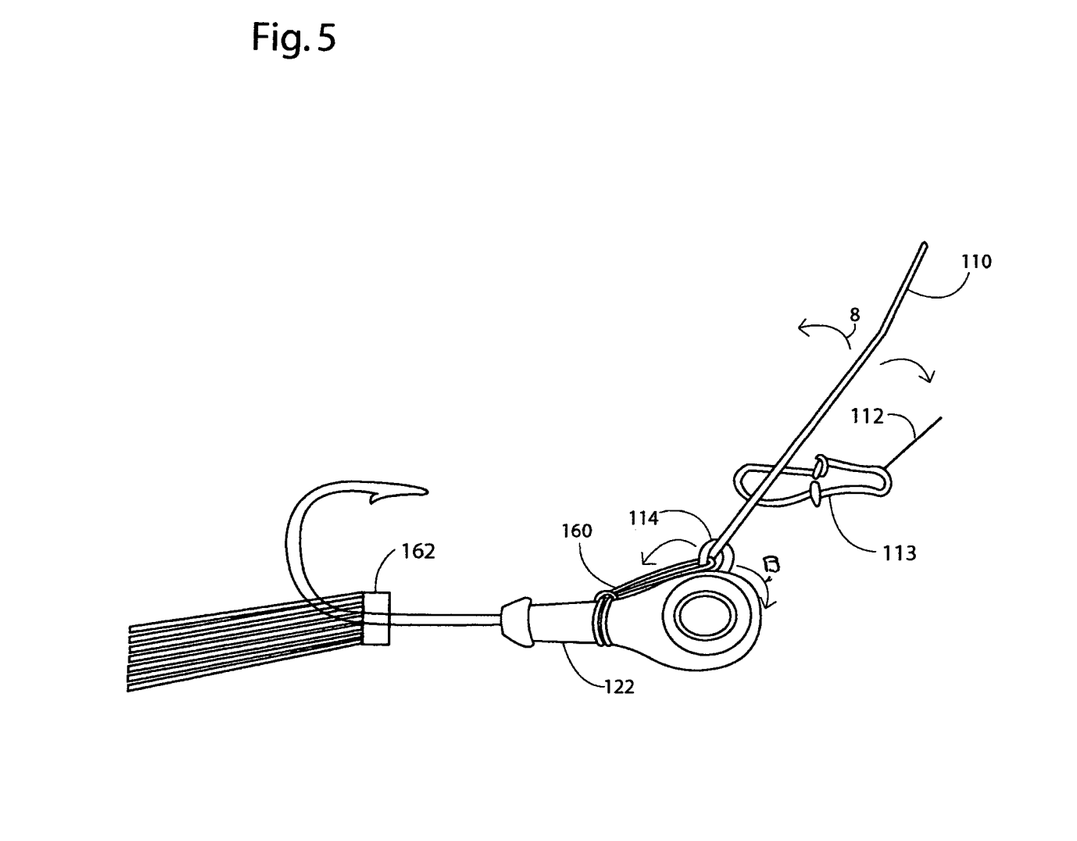
FIG. 5 shows additional details.

FIG. 5 shows the lure 100 almost completely assembled. The blade 110 has been attached to the movable 'S' loop 114. An elastic band 160 can be attached over the tail projection 122 and the 'S' loop 114 such that the 'S' loop 114 will be biased toward the back on the slot 130. In FIG. 5 the skirt 104 has been fitted over the hook 108. The skirt 104 includes a band 162 at its front, the band 162 is elastic material and the band 162 can be stretched over the tail projection 122 and 124 and will be retained there. The arrows B show that the loop 114 can move forward and backward within the slot 130, the loop 114 would have an angular range of about 120 degrees between the back and front of slot 130. The arrows 8 indicate that the blade 110 can move relative to the body 102. The blade 110 is attached to the S loop 114 and can move with it as well as moving relative to the loop 114.

Figure 6:
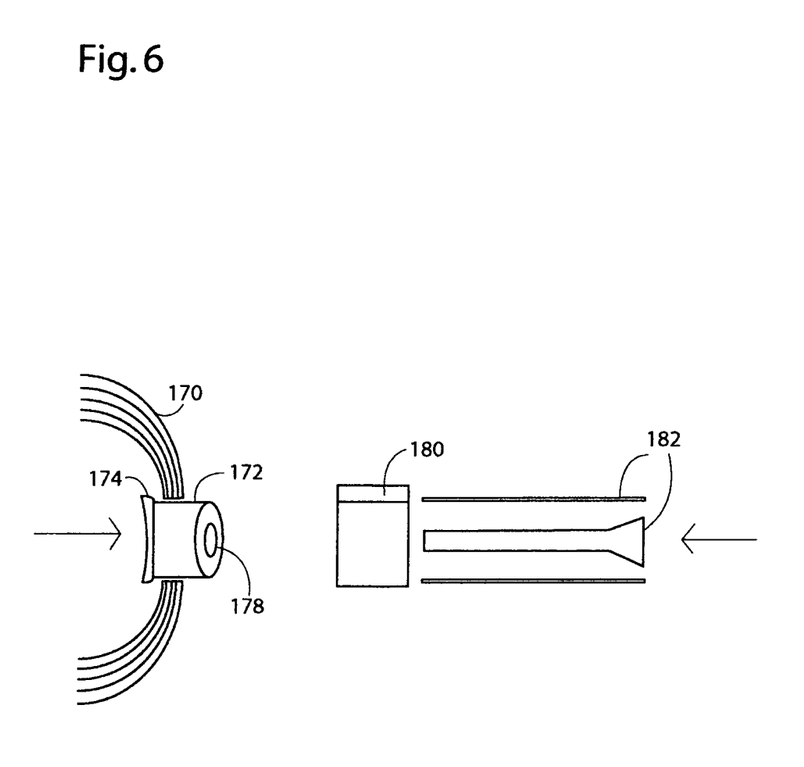
FIG. 6 shows details of the lure skirt of the lure of FIG. 1.

FIG. 6 shows details of the skirt 104 in an exploded view. The skirt 104 includes filaments 170 that can be glued to an elastic tube 172 that has a head portion 174. The elastic tube 172 includes a central opening 178 large enough to stretch fit over the tail projection 122 and 124 of the body 102. A second elastic tube 180 fits over the elastic tube 172 and can be adhesively attached. Additional filaments 182 can be adhesively attached between the tubes 172, 180. This arrangement makes some filaments 170 stand out from the lure 100 and others 182 tend to trail behind.

Figure 7:
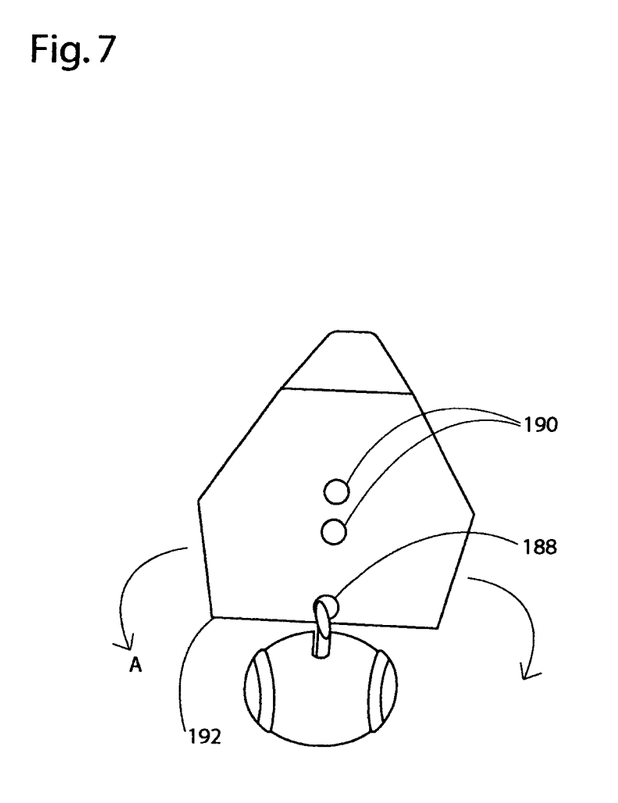
FIG. 7 shows a front view of the lure of FIG. 1.

FIG. 7 shows a front view of the lure 100. The blade 100 can pivot left or right as shown by the arrows A, about the loop 114. The blade 100 lower edge 192 adjacent the body 102 can strike the sides of the lure body 102 to create sound. The blade 110 can also pivot forward and backwards about the 'S' loop 114 as shown in FIG. 5. The blade 110 includes a hole 188 to attach it to the 'S' loop 114 and two holes 190 to attach it to the line 112.

Figure 8:
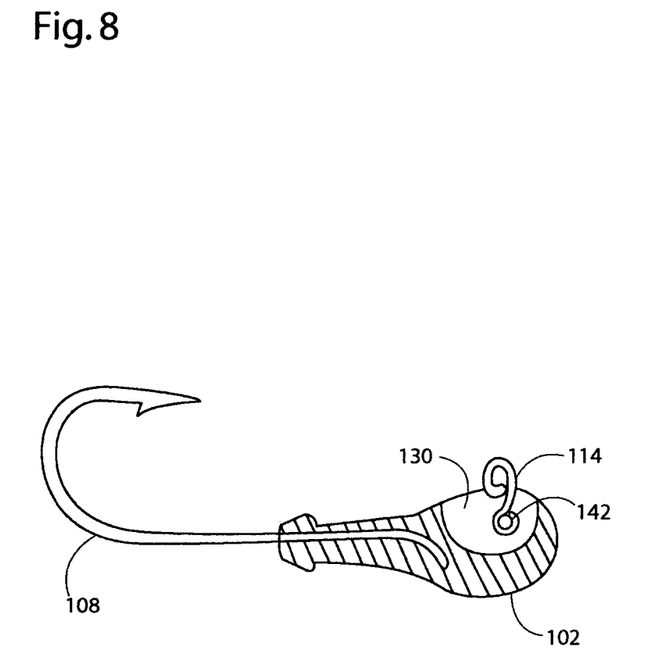
FIG. 8 shows a cross sectional view of the lure of FIG. 1.

FIG. 8 shows a cross sectional view of the lure 100 without the skirt 104. As can be seen the body 102 includes a slot 130 that allows the 'S' loop 114 to be pivotably mounted to the pin 142 and most of the loop 114 is concealed within the slot 130. The 'S' loop 114 includes an upper eye and a lower eye 142. This arrangement allows the loop 114 to pivot along the length of the body 102 and also allows the blade 110 to be mounted very close the body 102 such that the blade 110 will strike the body 102 during use. FIG. 8 shows that the lower eye 142 is entirely concealed below the surface of the lure body 102 and that the upper eye can be partially concealed. FIG. 8 also shows that the loop 114 is constructed by forming two interconnected circles in a wire. The interconnected circles can be closed or slightly open.

In use the lure 100 is attached to a fishing line 112 as shown in FIG. 1. As the lure 100 is pulled through the water the blade 110 has freedom of movement about the 'S' loop 114. The blade 110 will tilt forward as it is pulled through the water similar to the position shown in FIG. 1. Testing has shown this position is somewhat stable. The lure 100 will take a position and maintain it for several feet but variations caused by the water, skirt and pull will occasionally cause the blade 110 to hit the lure body 102 and make erratic action, the blade 110 will move sharply and strike the side of the lure body 102 creating sound and a flash of light as the blade 110 is made of reflective material. The erratic action of the lure 100 occurs automatically, requiring no special action from the fisherman, such that it will occur no matter how consistently the line 112 is pulled. The band 160 can be added or removed from the lure 100. When on the lure 100 the band 160 will tend to pull the loop 114 toward the back of the lure 100 opposite the direction of pull applied by line 112. Thus the harder the fisherman retrieves the line 112 the more the loop 114 is pulled toward the front of the slot 130. This creates additional instability and action in the blade 110 and body 102 as it is pulled through the water. Without the band 160 the 'S' loop 114 will tend to pivot to the front of slot 130 and will have less movement.

It will be obvious to those skilled in the art that modifications may be made to the embodiments described above without departing from the scope of the invention. Thus the scope of the invention should be determined by the claims in the formal application and their legal equivalents, rather than by the examples given.

I claim:

1. A fishing lure includes a body, a skirt, a blade and a hook, the body includes a pivotable loop that attaches the blade to the body, the loop is pinned to the body but pivots about the pin in a slot disposed in a non-planar head section of the body, and wherein said slot has a length that is generally parallel to a length of the body, a line is attached to the blade at a point spaced from said loop, the skirt includes flexible filaments and is attached to the body, wherein a first eye on said loop is spaced from said pin and wherein the slot has a front end and back end and the loop moves from the front to the back of the slot as it pivots about said pin, and wherein the loop is wire and has an 'S' shape wherein the blade is attached to the first eye of the loop and the pin passes through a second eye of the loop such that as said loop pivots about said pin said first eye travels along the length of said slot such that said blade can strike said body along the length of said slot.

2. The lure of claim 1 wherein the hook is molded into the body and the body includes an elastic band that biases the first eye toward the back end of the slot wherein the line pulls the first eye toward the front of the slot and wherein the elastic band has a first end passing through said loop and an opposite end wrapped around a tail section of the body.

3. The lure of claim 2 wherein the skirt is held in place on said body by the elastic band.

4. The lure of claim 3 wherein said elastic band wraps around a tail section of said body wherein said head section is enlarged compared to said tail section such that said elastic band is held in place on said tail.

5. The lure of claim 1 wherein the pin is mounted in a hole drilled perpendicular to the slot and wherein opposite ends of the pin are hidden by a decorative feature of the lure.

6. The lure of claim 3 wherein the slot is deep enough to entirely conceal said second eye.

7. A fishing lure includes a body, a blade and a hook, the body includes a pivotable 'S' shaped wire loop that attaches the blade to the body, the 'S' shaped wire loop is pinned to the body and pivots about the pin in a slot disposed in a non-planar head section of the body, the body defining a longitudinal axis and wherein said slot has a length that is generally parallel to said longitudinal axis,
a line is attached to the blade at a point spaced from said 'S' shaped loop wherein the 'S' shaped wire loop includes a first eye attached to the blade and a second eye pinned to the body and wherein said first eye is spaced from said pin such that as said 'S' shaped wire loop pivots about said pin said first eye travels along the length of said slot such that said blade can strike said body along the length of said slot.

8. The lure of claim 7 wherein the first eye is adjacent a body surface of the lure and, the slot is deep enough to entirely conceal said second eye.

9. The lure of claim 8 wherein the first eye includes an elastic band that biases the first eye toward a back end of the slot and wherein pulling on said line tends to bias the first eye toward the front of the slot wherein the elastic band has a first portion passing through said 'S' shaped wire loop and second portion wrapped around a tail section of the body.

10. The lure of claim 8 wherein the slot has a length that is generally parallel to a length of the body.

11. The lure of claim 8 wherein the lure includes a skirt attached adjacent said hook and said skirt includes an elastic band that holds said skirt on said body.

12. A fishing lure includes a body, a blade and a hook, the body includes a pivotable wire loop that attaches the line to the body, the wire loop is pinned to the body and pivots about the pin in a slot in the body, a skirt is attached to the body adjacent said hook wherein the wire loop includes a first eye attached to the blade and a second eye pinned to the body wherein said first eye is spaced from said pin and such that as said loop pivots about said pin said first eye travels along the length of said slot such that said blade travels along the length of said slot from a front end to a back end and the body includes a first elastic band that biases the first eye toward the back end of the slot wherein in use the line pulls the first eye toward the front of the slot as it pulls the lure through water.

13. The lure of claim 12 wherein the slot is in a head section of the body and wherein said elastic band wraps around a tail section of said body wherein said head section is enlarged compared to said tail section such that said elastic band is held in place on said tail and further wherein said wire loop is 'S' shaped.

14. The lure of claim 13 wherein the slot has a length that is generally parallel to a length of the body and length of the hook.

15. The lure of claim 13 wherein the lure includes a skirt surrounding said hook and said skirt includes a second elastic band that holds said skirt on said body.

16. The lure of claim 13 wherein the pin is mounted in a hole drilled perpendicular to the slot and wherein opposite ends of the pin are hidden by a decorative feature of the lure where said decorative feature is held in a depression in said head section.

* * * * *